United States Patent
Wolf et al.

(10) Patent No.: US 8,271,166 B2
(45) Date of Patent: Sep. 18, 2012

(54) DEVICE AND METHOD FOR CONTROLLING AN AUTOMATIC TRANSMISSION IN A MOTOR VEHICLE

(75) Inventors: Andreas Wolf, Ravensburg (DE); Lutz Muller, Herdwangen-Schonach (DE); Rupert Kramer, Friedrichshafen (DE); Jerome Lochard, Friedrichshafen (DE); Michael Buckhart, Uhldingen-Muhlhofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 620 days.

(21) Appl. No.: 11/722,916

(22) PCT Filed: Feb. 16, 2006

(86) PCT No.: PCT/EP2006/001383
§ 371 (c)(1),
(2), (4) Date: Jun. 27, 2007

(87) PCT Pub. No.: WO2006/087187
PCT Pub. Date: Aug. 24, 2006

(65) Prior Publication Data
US 2008/0208419 A1    Aug. 28, 2008

(30) Foreign Application Priority Data
Feb. 17, 2005  (DE) .......................... 10 2005 007 128

(51) Int. Cl.
*G06F 7/00* (2006.01)
(52) U.S. Cl. ............... 701/52; 701/51; 477/34; 475/130
(58) Field of Classification Search ..................... 701/52, 701/51, 53; 477/34, 97; 475/123, 125
See application file for complete search history.

(56) References Cited

U.S. PATENT DOCUMENTS

| | | | | |
|---|---|---|---|---|
| 5,875,410 A * | 2/1999 | Fowler et al. | ................... | 701/64 |
| 6,035,735 A * | 3/2000 | Graf et al. | ........................ | 74/335 |
| 6,085,139 A * | 7/2000 | Nakauchi et al. | ................ | 701/52 |
| 6,382,041 B1 | 5/2002 | Burgbacher et al. | | |
| 2002/0049117 A1* | 4/2002 | Ohashi et al. | ................... | 477/97 |
| 2003/0013571 A1* | 1/2003 | Tabata | .......................... | 475/125 |
| 2004/0002806 A1* | 1/2004 | Bellinger | ...................... | 701/104 |
| 2004/0225430 A1* | 11/2004 | Bothe et al. | ...................... | 701/52 |
| 2005/0090355 A1* | 4/2005 | Ota et al. | ....................... | 475/123 |

(Continued)

FOREIGN PATENT DOCUMENTS
DE          32 01 440 A1    9/1983
(Continued)

OTHER PUBLICATIONS

1st Office Action for the corresponding Chinese patent application dated Mar. 6, 2009.

(Continued)

*Primary Examiner* — Helal A Algahaim
(74) *Attorney, Agent, or Firm* — Davis & Bujold, P.L.L.C.

(57) ABSTRACT

A device and a method for control of an automatic transmission (1) in a vehicle having one control unit (2), which can receive signals produced by a transmission gearshift lever (7), and/or a first transmission control (8). The signals of the first transmission control are bridgeable so that the automatic transmission can be manually operated. In order to make it possible to efficiently operate the vehicle with low fuel consumption and great flexibility of the driver at the moment, manual operation of the automatic transmission is possible only when the vehicle is at speed (v) lower than a predetermined speed limit.

1 Claim, 3 Drawing Sheets

U.S. PATENT DOCUMENTS

| | | | |
|---|---|---|---|
| 2005/0209760 A1* | 9/2005 | Tabata et al. | 701/53 |
| 2006/0015234 A1* | 1/2006 | Luh | 701/51 |
| 2006/0111219 A1* | 5/2006 | Kramer et al. | 477/107 |
| 2006/0276950 A1* | 12/2006 | Wild et al. | 701/51 |

FOREIGN PATENT DOCUMENTS

| | | |
|---|---|---|
| DE | 40 33 574 A1 | 5/1991 |
| DE | 197 36 406 A1 | 3/1999 |
| DE | 199 57 151 A1 | 6/2001 |
| DE | 101 05 749 A1 | 8/2002 |
| DE | 102 30 805 A1 | 5/2003 |
| DE | 102 22 665 A1 | 12/2003 |
| DE | 103 11 638 A1 | 10/2004 |
| JP | 2004076873 | 3/2004 |
| WO | WO-2004/081417 * | 9/2004 |

OTHER PUBLICATIONS

2nd Office Action for the corresponding Chinese patent application dated Jun. 14, 2011.

D2—Automobile Electrical Appliance, vol. 4, 2002, "Use of an Automatic-transmission Vehicle", published Apr. 30, 2002.

D3—City Vehicles, vol. 2, 2003, "Reasonable application of automatic transmission gears", published Feb. 28, 2003.

D4—Automobile Maintenance and Repair, vol. 2, 2001, "01 type automatic-manual integrative transmission", published Feb. 28, 2001.

* cited by examiner

DEVICE AND METHOD FOR CONTROLLING AN AUTOMATIC TRANSMISSION IN A MOTOR VEHICLE This application is a national stage completion of PCT/EP2006/001383 filed Feb. 16, 2006, which claims priority from German Application Serial No. 10 2005 007 128.7 filed Feb. 17, 2005.

FIELD OF THE INVENTION

The invention relates to a device and a method for controlling an automatic transmission in a motor vehicle.

BACKGROUND OF THE INVENTION

It is known that automatic transmissions in motor vehicles can be controlled to either fully automatically or manually change their reduction ratio. In the manual operation, the driver usually sets the desired gear by actuating a selector lever. This can be advantageous in the fully automatic operation of the vehicle when satisfactory driving properties cannot be obtained from the driver's point of view.

A shift from fully automatic to a manual operation can be disadvantageous, however, for example when a fuel consumption as much as possible. Especially in commercial vehicles, great experience and discipline is demanded of the driver, if an optimally low fuel consumption is to be achieved by manual gear selection.

In the absence of these attributes, this circumstance can be economically disadvantageous for vehicles in a fleet company. On the other hand, if only fully automatic operation of a vehicle transmission is allowed, the driver's flexibility is extensively limited. This can also be disadvantageous for the driver or economically disadvantageous for the company.

With this background, the problem on which the invention is based is to create a device and a method where a vehicle, having an automatic transmission, can be operated with low fuel consumption and great flexibility regarding the maneuverability of the transmission.

SUMMARY OF THE INVENTION

The invention is based on the knowledge that for low fuel consumption with great flexibility, for example, regarding the style of driving of the driver, fully automatic operation of an automatic transmission is adequate in a great number of situations, and with manual transmission operation, the same is only of importance in exceptional cases. These exceptional cases include dropping below a predetermined low speed and/or shunting operation, particularly of a commercial vehicle.

Accordingly, the inventive device is different from a device for control of an automatic transmission in a motor vehicle. The device has a control unit by which signals can be received which are produced by a gear selector lever and/or a first transmission control. The signals of the first transmission control are bridgeable in a manner such that the automatic transmission can be manually operated. In addition, it is provided that, with the device, manual operation of the automatic transmission is possible only when the vehicle has a speed lower than a predetermined speed limit.

It is possible to fall below such a speed limit, for example during ascents, steep descents, parking or shunting. With the inventive device, the vehicle's driver is in a position to bridge the fully automatic operation of the automatic transmission by a manual gear selection, i.e., to be able to automatically shift the automatic transmission. If this speed limit is exceeded, then only fully automatic operation of the automatic transmission is possible by which efficient utilization of the power of the motor is achieved. This is deemed as an advantageous especially economical mode of driving operation.

Manual operation of the automatic transmission is also permitted when there is failure in controlling the transmission or in the transmission proper.

Besides, it can preferably be provided that manual operation of the automatic transmission be also possible when the selector lever of the transmission is in a position different from a "forward gear direction". This is an advantage, since the forward gear direction, for example in the selector lever position "D", is possible for only fully automatic operation of the automatic transmission. The percentage of motion thus considerably increases in the automatic program of an automatic transmission. The speed limit for the forward drive operation is thus at 0 km/h below which a manual operation of the automatic transmission is still possible in this embodiment.

It can further be provided that manual shifting of the automatic transmission be possible only when the transmission selector lever is in a position different from the "forward gear direction" and/or the "reverse gear direction". Thus, fully automatic operation of the transmission is specified when the transmission selector lever is in forward drive and reverse drive. A manual shifting of the gears is permitted only when the vehicle is parked or when a failure exists. The percentage of load share of the automatic programs "D" and "R" of an automatic transmission thus amounts to 100%.

It also can be preferably provided that the device has a memory unit with at least one data field and/or shifting program for the automatic transmission, which are provided for the first transmission control so that operation of the vehicle can be achieved with relatively low fuel consumption. This is advantageous, since such data fields and/or shifting programs can be flexibly programmed and adapted to the existing driving situations or vehicle configurations.

Additionally, it can be preferably provided that the device does nor further process signals which have been produced by actuating a kickdown switch.

This is an advantage since when, actuating a kickdown switch, an automatic transmission usually is actuated so that a lower gear ratio is used. As a rule, this is not associated with higher fuel consumption. If signals of the kickdown switch are ignored by the inventive device, consumption-optimized operation can be facilitated in the vehicle with the automatic transmission.

Furthermore, it can be provided that the vehicle can be operated only with one specific reverse gear of several reverse gears when the transmission selector lever is in the reverse gear direction "R" position. If an automatic transmission of a commercial vehicle has several reverse gears, then this embodiment of the invention is advantageous when regarding consumption-optimized operation of the vehicle when, for example the highest possible reverse gear is always selected. Should a difficult shunting situation appear, the driver can over-ride the automatic mode by dropping below the speed limit threshold and manually activating the lowest reverse gear.

In addition, it can be advantageously provided that the inventive device can receive signals from at least one other transmission control. These signals of the other transmission control are bridgeable so that the automatic transmission can be manually shiftable, independently of the vehicle speed or position of the selector lever. This is advantageous in the case of a defect for example, one other transmission control is available, which permits full flexibility during the gear selection. In such a case, there are no limitations, so that the vehicle can be operated with a manual gear selection in all gears and in the whole rotational speed range of the motor.

It is also deemed advantageous if a selection can be obtained from signals of either the first transmission control or signals of one other transmission control. This is important since operation of the vehicle with the automatic transmission is thus possible by either the first transmission control or one other transmission control.

It can also be preferably provided that signals, either from the first transmission control or from one other transmission control, can be selected by way of a switch. This is of an advantage since the driver can, for example, by way of a selector switch, manually select the transmission control adequate according to the driving situation, the load state of the vehicle or any other parameters.

Transmission controls, according to the invention, can consist both of hardware units or be made from software functions. Thus two or more transmission controls can be provided, each containing alternative modes of operation.

It also can be preferably provided that the device for controlling of an automatic transmission be designed for commercial vehicles. This is advantageous for commercial vehicles having very high mileage. Consumption-optimized operation of the vehicle is associated with a significant economic advantage.

The invention further relates to a method for controlling of an automatic transmission of a motor vehicle byway of a device, such as described below.

BRIEF DESCRIPTION OF THE DRAWINGS

The invention will now be described, by way of example, with reference to the accompanying drawings in which.

DETAILED DESCRIPTION OF THE INVENTION

Figure 1:
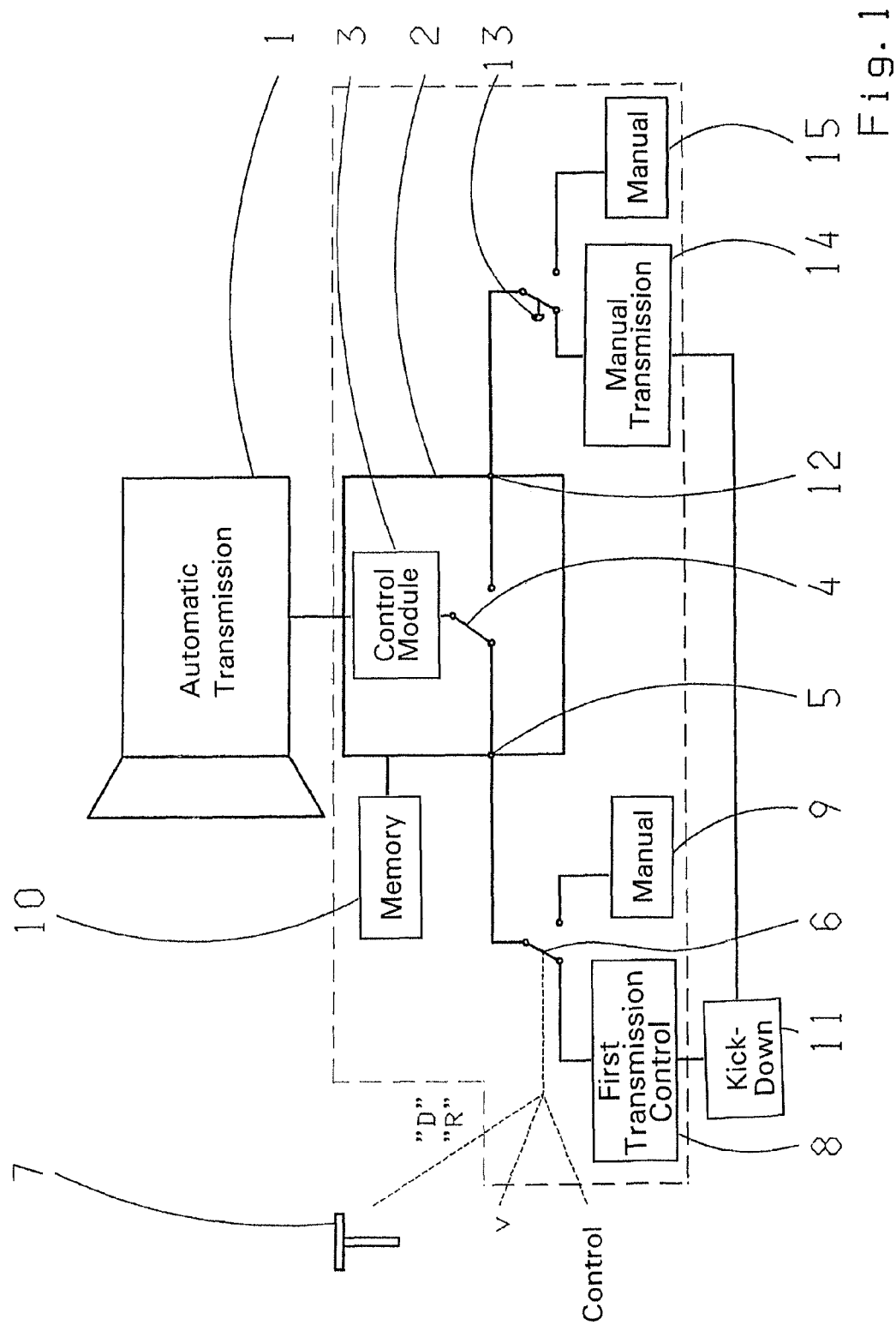
FIG. 1 is a schematic representation of an embodiment of a design of the inventive device.

FIGS. 1 shows a schematic representation of an embodiment of the inventive control device which can be a component part of a transmission control unit. An automatic transmission I is controlled by a control unit 2, which has a control module 3. The control module 3, via shifting valves, actuate shifting elements, such as hydraulic or pneumatic shifting units, electric motors, electromechanicals, electromagnetic adjusting elements, multi-disc clutches or brakes of the transmission, whereby gear ratio changes of the transmission are adjusted.

The control unit 2 also has one switch 4 which, in this embodiment, can be shifted between two shifting positions. The switch 4, which can be mechanically or electronically shifted by way of software, can be actuated by way of a key, which is externally rotated by the driver, in a lock switch. The switch can also be designed as a software switch. An input 5 of the control unit 2 can be controlled with the switch 4.

A first transmission control 8 is connected with the input 5 by way of a switch 6, such that it can be connected to the control unit 2 or separated therefrom. In this embodiment, the position of the switch 6 is dependent on the position of a gearshift lever 7 with which a rough preselection of the gear ratio of the automatic transmission, to be automatically selected, can be carried out. When the gearshift lever is in the position "D", movement of the vehicle in the forward direction is possible. In the gearshift lever position "R", the automatic transmission 1 is shifted so that only reverse gears are provided.

A vehicle speed v can also be another parameter for determining the position of the switch 6. If the speed v is above a predetermined limit value, the first transmission control 8 is connected. Below the limit values, on the other hand, the automatic transmission 1 can be controlled not only by way of the first transmission control 8 but, if the driver wishes, can be operated by a manual gear selection 9. The switch 6 can be mechanically or electronically designed and, in the latter alternative, can be shifted by way of software.

The device can also have a memory unit 10 where shifting programs and/or data fields for the control tasks of the automatic transmission are stored. The shifting programs and/or data fields can be designed such that the vehicle can be operated with low fuel consumption. With manual gear selection, the data fields are no longer taken into account.

According to another embodiment of the inventive device, the first transmission control 8 can also be connected with a kickdown switch 11. In the case of stepping on the accelerator pedal (kickdown), for example, to make a passing maneuver, there is a reverse shift by one or more gears, in so far as possible. The shifted gears are then each extended approximately up to the motors highest rotational speed to improve the acceleration characteristic of the vehicle. If consumption-optimized drive is possible, signals from the kickdown switch 11 are not taken into account by the first transmission control 8. But in another alternative of the invention, to achieve greater flexibility of the driving style, the signals of the kickdown switch 11 can be permitted.

As can be seen in FIG. 1, the switch 4 can also be shifted into a different position to connect to an input 12 of the control unit 2. The input can be attached to a second transmission control 14, which is provided either as the sole available transmission control or as an alternative to the first transmission control 8. Like the first transmission control 8, a change from automatic to manual gear selection is possible, with the second transmission control 14.

The switch from the second transmission control 14 to the manual gear selector 15 can be carrier out, for example, by way of a selector lever 13. At the same time, it is possible to activate the selector lever 13 at any time, in any driving situation and with driving style, such that it is possible to change the operation of the transmission from an automatic transmission control to a manual gear selection. The second transmission control 14 can be provided as standard equipment in the vehicle while the first transmission control 8 and an appertaining memory part 10 can be additional provided.

Figure 2A:
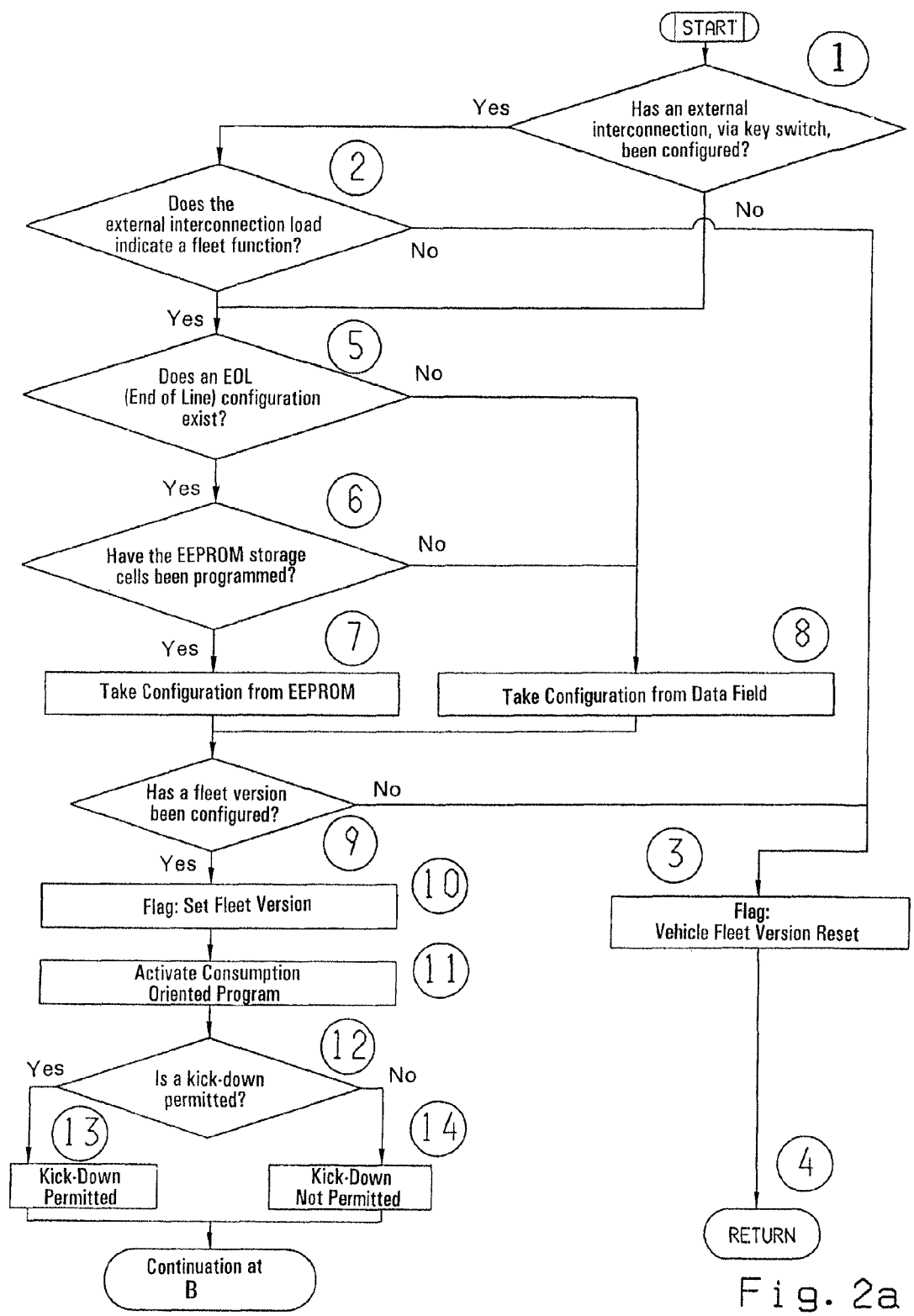
FIG. 2a is a cycle diagram with method steps for the control of an inventive automatic transmission.
Figure 2B:
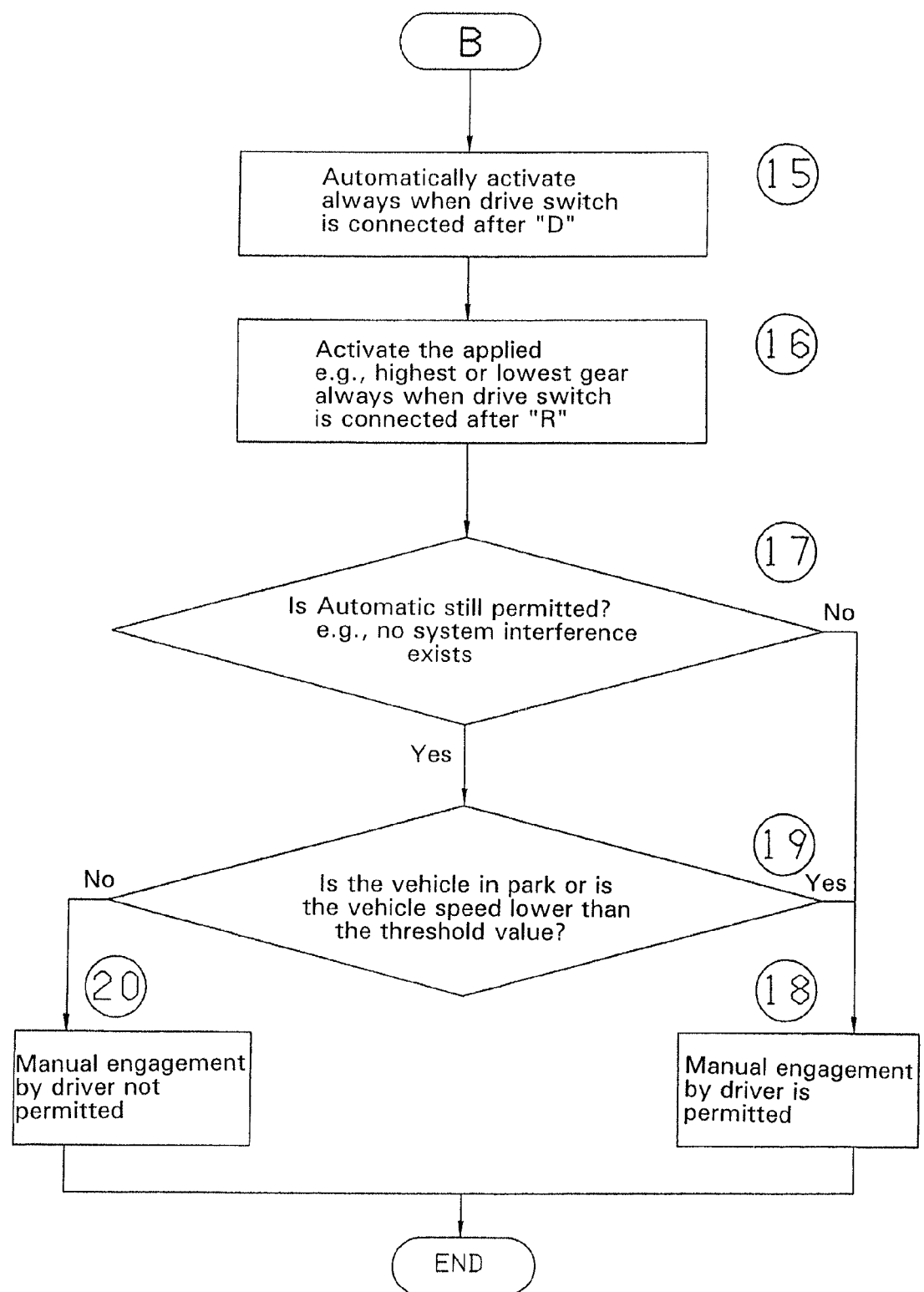
FIG. 2b is a cycle diagram with method steps for the control of an inventive automatic transmission.

Shown in FIGS. 2a and 2b is a flow chart of an embodiment of a method of controlling an automatic transmission of a vehicle. Each method step in FIGS. 2a and 2b is designated with numbers provided in a circle. In the description that follows, steps are respectively marked with a preceding "S".

The method of control can be initiated, for example, by applying a voltage to the transmission control unit by turning the vehicle ignition. Step S1, is a verification step to check whether an external connection, by way of a key switch, has been made. If such is the case, an external signal, such as an electric voltage level, is read in.

At the same time, in step S2, the height of the voltage level can be verified. If the voltage level corresponds to a predetermined position "vehicle fleet version", this indicates that the control unit can process signals of a transmission control which are especially adjusted to meet the requirements of commercial vehicles or of a vehicle fleet company. If the voltage level, in step S2, does not correspond to the definition for the selection of the vehicle fleet version, then the corresponding flag is turned back (at step S3) so that an operation, according to the vehicle fleet version, is not allowed.

As a consequence thereof, in step S4, a transmission control, having no properties of the vehicle fleet version, is used instead. This can be a conventional transmission control, such as the second transmission control 14 according to FIG. 1, where manual gear selection is possible, independent of either the position of the transmission gearshift lever 7 or of the vehicle speed v. If the voltage level, in step S2, matches the definition for selecting the vehicle fleet version, step S5 follows as the next method step (see herebelow).

In step S1, if it is found that an external interconnection has not been made, no reverse shift occurs chiefly in a conventional transmission control program.

In step 5, it is verified whether an end of line configuration exists. In an end-of-line (EOL) programming, required programs are input into the relevant control unit of the transmission or vehicle, during the production of the transmission or vehicle in a plant. A subsequent change or enlargement of the vehicle programming can only be undertaken by way of admissible authorization.

If a configuration for one such EOL programming is activated then, in step S6, it is examined whether the appropriate cells, via an adequate permitted programming tool, have been programmed in a memory module EEPROM. If valid configuration values exist in the EEPROM, step S7, these are used for further program decisions. In step S8, if the configuration for an EOL program has not been activated or the appropriate cells have not been programmed in the EEPROM, the data from one other data field of the transmission control are read out.

Step S9 examines whether the data originating from the respective data field configure a vehicle fleet version. If this is not the case, it is returned to step S3 where the flag for the vehicle fleet version is reset. It is then returned to the normal transmission control, the second transmission control 14 in FIG. 1.

If a vehicle fleet version was configured then, in step S10, a flag is set for the vehicle fleet version. It is thus permitted that the shifting program and/or data provided for a vehicle fleet version is used.

In order to maximize the functionality "vehicle fleet version" with regard to fuel consumption, in step S11, there now results, in this embodiment, an automatic change to a fuel-consumption optimized data range of the transmission control.

Step S12 examines whether the kickdown function (reverse shifting demand when the accelerator pedal has been pressed by the driver) is permitted (step S13) or not permitted (step S14). If the kickdown function is not permitted, one other consumption-optimized operation of the vehicle is possible.

Then the position of the transmission selector lever is examined. When the gearshift lever 7 is in the "forward gear direction" position (e.g., "D"), the automatic operation is strictly undertaken for the automatic transmission. A manual engagement or a gear change by the driver is thus eliminated in the vehicle fleet version, see step S15. When the selector lever is in position "R" for "reverse gear direction" in one embodiment, a special reverse gear of a commercial vehicle transmission, having several reverse gears, can be selected. The reverse gear can be, for example the next higher or the next lower reverse gear, step S16.

Step 17, if a system failure is detected in the transmission control, then a manual engagement or gear change by the driver is permitted, step S18. In the absence of a system failure, in step S19, examines whether the vehicle is stationary or whether the vehicle speed v is lower than a predetermined speed threshold value. If this is so, an engagement by the driver is likewise permitted. Otherwise, a manual engagement by the driver is not permitted, step S20.

| Reference numerals | |
|---|---|
| 1 | automatic transmission |
| 2 | control unit |
| 3 | control module |
| 4 | switch |
| 5 | input |
| 6 | switch |
| 7 | transmission gearshift lever |
| 8 | first transmission control |
| 9 | manual gear selection |
| 10 | memory part |
| 11 | kickdown switch |
| 12 | input |
| 13 | selector lever, caliper |
| 14 | second transmission control |
| 15 | manual gear selection |
| D | forward drive step |
| R | reverse drive step |
| v | speed |

The invention claimed is:

1. A method of controlling an automatic transmission of a motor vehicle with a device having a control unit (2) communicating with at least one of a transmission gearshift lever (7) and a first transmission control (8), the method comprising the steps of:

controlling the automatic transmission with the control unit either one of manually and automatically depending on signals sent from the first transmission control (8) to the control unit, the signals of the first transmission control (8) being bridgeable such that the automatic transmission (1) is either one of manually and automatically operable;

enabling the manual operation of the automatic transmission (1) only when the motor vehicle is traveling at a speed (v) lower than a predetermined speed limit;

changing control of the automatic transmission from automatic control to manual control only when either the motor vehicle is traveling at a speed (v) lower than a predetermined speed limit or at least one of control of the automatic transmission fails and the automatic transmission fails; and not permitting manual engagement when the motor vehicle is not traveling at a speed (v) lower than a predetermined speed limit.

* * * * *